United States Patent
Jeon et al.

(10) Patent No.: US 8,411,644 B2
(45) Date of Patent: Apr. 2, 2013

(54) APPARATUS FOR TRANSMITTING/RECEIVING BEACON SIGNAL AND METHOD THEREOF

(75) Inventors: Beom Jin Jeon, Seoul (KR); Joong Heon Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 222 days.

(21) Appl. No.: 13/055,102

(22) PCT Filed: Jul. 20, 2009

(86) PCT No.: PCT/KR2009/003992
§ 371 (c)(1),
(2), (4) Date: Mar. 10, 2011

(87) PCT Pub. No.: WO2010/011062
PCT Pub. Date: Jan. 28, 2010

(65) Prior Publication Data
US 2011/0158198 A1 Jun. 30, 2011

Related U.S. Application Data

(60) Provisional application No. 61/082,218, filed on Jul. 20, 2008.

Foreign Application Priority Data

Nov. 19, 2008 (KR) .......................... 10-2008-0115182

(51) Int. Cl.
*H04J 3/24* (2006.01)
(52) U.S. Cl. ........................................ 370/334; 370/349
(58) Field of Classification Search .................. 370/312, 370/339, 349, 334, 373, 471
See application file for complete search history.

(56) References Cited

U.S. PATENT DOCUMENTS

| | | | |
|---|---|---|---|
| 6,985,498 B2 * | 1/2006 | Laroia et al. | 370/478 |
| 7,489,646 B2 * | 2/2009 | Sung et al. | 370/280 |
| 2004/0013135 A1 | 1/2004 | Haddad | |
| 2005/0226203 A1 * | 10/2005 | Ho | 370/349 |
| 2007/0002743 A1 | 1/2007 | Fan | |

FOREIGN PATENT DOCUMENTS

| | | |
|---|---|---|
| EP | 1478135 A1 | 11/2004 |
| WO | WO 2006/138058 A2 | 12/2006 |
| WO | WO 2008/009003 A2 | 1/2008 |

OTHER PUBLICATIONS

Chen, et al., "An energy diffserv and application-aware MAC scheduling for VBR streaming video in the IEEE 802.15.3 high-rate wireless personal area networks", Journal Computer Communications, vol. 29, Issue 17, Abstract only, Section 1, Nov. 2006 (Posted online Mar. 10, 2006), XP 25090074.

* cited by examiner

*Primary Examiner* — Brenda H Pham
(74) *Attorney, Agent, or Firm* — Birch, Stewart, Kolasch & Birch, LLP

(57) ABSTRACT

Methods and apparatuses of transmitting a beacon using fragmentation are disclosed. One of the methods includes configuring a beacon in a manner that a schedule block selected for a specific wireless device (deice) only is included in an information element by a coordinator and transmitting the configured beacon to the specific wireless station directionally. Accordingly, an overhead of a beacon can be reduced in a manner of transmitting information specified to a station using a directional beacon or transmitting the beacon by dividing information contained in the beacon into several fragments.

9 Claims, 4 Drawing Sheets

Fig. 1
| MAC Control Header | Beacon Control | Information Elements (IE) | Parity Check Sequence |
Fig. 2
| IE Index | Length | Schedule Block 1 | Schedule Block 2 | ... | Schedule Block n |
Fig. 3
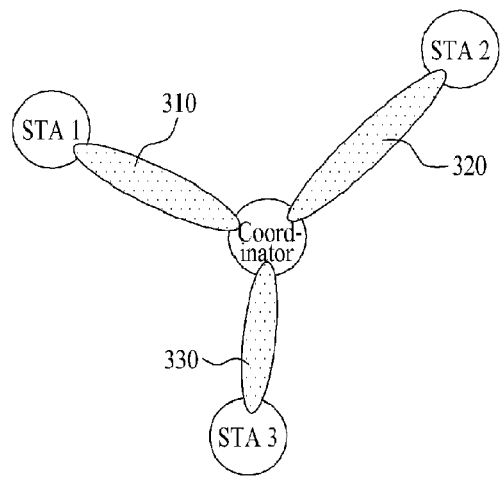
Fig. 4
| IE Index | Length | Control IE | CAP Allocation IE | Schedule IE |
Fig. 5
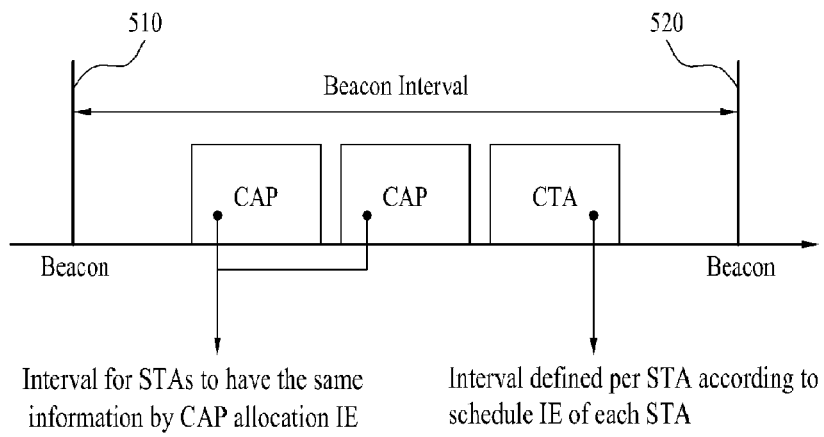

APPARATUS FOR TRANSMITTING/RECEIVING BEACON SIGNAL AND METHOD THEREOF

This application is the National Phase of PCT/KR2009/003992 filed on Jul. 20, 2009, which claims priority under 35 U.S.C. 119(e) to U.S. Provisional Application No. 61/082,218 filed on Jul. 20, 2008 and under 35 U.S.C. 119(a) to Patent Application No. 10-2008-0115182 filed in the Republic of Korea on Nov. 19, 2008, all of which are hereby expressly incorporated by reference into the present application.

TECHNICAL FIELD

The present invention is directed to an apparatus for reducing beacon overhead and a method thereof.

BACKGROUND ART

Generally, the mmWave standard calls for a carrier frequency of 60 GHz and a channel bandwidth of 0.5~2.5 GHz. Therefore, the mmWave standard calls for a carrier frequency and a channel bandwidth considerably greater than those of the conventional IEEE 802.11 series standard. If a radio frequency signal having a wavelength in the millimeter range is used, it is possible to provide a considerably high data rate on the order of several gigabits (Gbps). It is also possible to implement this using a single chip including an antenna having a size of 1.5 mm or less.

Because the attenuation ratio of air is very high, it is advantageous to reduce inter-station interference.

Likewise in the case of mmWave transmissions, the reaching (i.e., maximum) distance of a beam is also decreased due to high attenuation ratio. Therefore, it is particularly difficult to transmit a signal omni-directionally. In order to solve this problem, a beam needs to be sharpened. In so doing, the beam is locally delivered only (i.e., is limited to a relatively small coverage area).

In a Piconet using mmWave transmissions, a coordinator periodically transmits a beacon. The beacon generally has the structure shown in FIG. 1 in association with the medium access control (MAC) layer. As shown, the beacon includes a MAC control header, an information elements (IE) field, a parity check sequence and the like.

When a beacon is configured in accordance with current network standards, information elements are added. Various kinds of information elements exist according to the network standard. If a plurality of information elements are added to a beacon, the length of the beacon may increase significantly, thus resulting in excessive overhead.

A schedule information element (IE) is generally included in a beacon. As the name suggests, a schedule information element carries scheduling information, such as the information shown in Table 1.

TABLE 1

| Item | Description |
|---|---|
| IE Index | Identifying whether a present IE is a schedule IE |
| Length | Length of whole IE |
| Schedule Block 1 | Having schedule information with DEV 1 |
| Schedule Block 2 | Having schedule information with DEV 2 |
| … | … |
| Schedule Block n | Having schedule information with DEV n |

As shown, the beacon may include schedule information associated with many wireless devices (DEV1, ..., DEVn) existing in the piconet. However, it is not necessary for one device to receive information relating to another device.

DISCLOSURE OF INVENTION

Technical Problem

The present invention relates to an apparatus and/or a method for reducing the overhead of a beacon and method thereof. Although the present invention is suitable for a wide range of applications, it is particularly suitable for reducing the overhead of the beacon by optimizing the informational elements associated with the beacon and adjusting the transmission period of the elements.

Advantageous Effects

The present invention is directed to an apparatus for reducing beacon overhead and a method thereof. The present invention generally achieves this by more efficiently and effectively transmitting schedule information elements. More specifically, overhead can be reduced by transmitting schedule information for a given device using a directional beacon or by dividing the information and transmitting the information over several beacons.

BRIEF DESCRIPTION OF DRAWINGS

The accompanying drawings, which are included to provide a further understanding of the invention and are incorporated in and constitute a part of this specification, illustrate various exemplary embodiments of the present invention and together with the detailed description serve to explain the principles of the invention.

In the drawings:

FIG. 1 illustrates the general structure of a beacon related to MAC layer;

FIG. 2 illustrates the general structure of the information element field shown in FIG. 1;

FIG. 3 illustrates an exemplary case where the coordinator directionally transmits a beacon;

FIG. 4 illustrates an IE structure of a beacon according to one exemplary embodiment of the present invention and according to a directional beacon as shown in case of FIG. 3;

FIG. 5 illustrates a beacon interval;

BEST MODE FOR CARRYING OUT THE INVENTION

Figure 6:
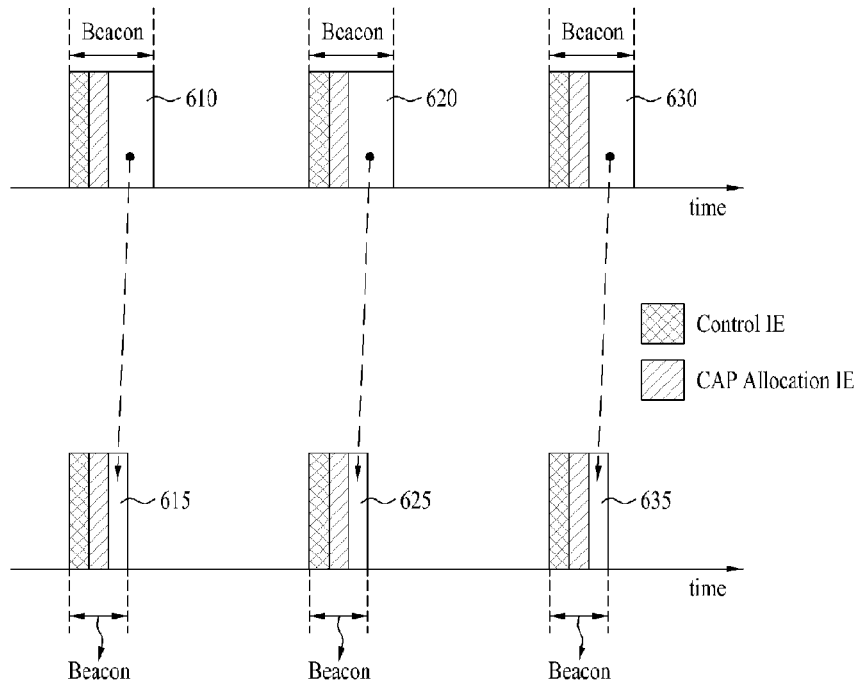
FIG. 6 is a diagram comparing a conventional beacon and a directional beacon, with respect to a beacon interval, according to the first exemplary embodiment of the present invention.

The above-identified and other objectives are achieved by an apparatus and a method that involve transmitting a beacon signal to at least one of a plurality of wireless stations. In accordance with this apparatus and method, a beacon signal is generated for a target station, where the beacon signal includes dedicated scheduling information for the target station. The beacon signal is then directionally transmitting to the target station.

The above-identified and other objectives are also achieved by an apparatus and method that involve transmitting beacon signals, that include static information and dynamic information, to each of a plurality of wireless stations. In accordance with this apparatus and method, the static information is divided into a plurality of static information fragments. Then, a sequence of beacon signals are generated, each including dynamic information and at least one of said static information fragments. The sequence of beacon signals are transmitted omni-directionally to the plurality of wireless stations such that all of the static information is transmitted when all of the beacon signals have been transmitted.

Still further, the above-identified and other objectives are achieved by an apparatus and method that involve receiving a beacon signal from a coordinator. In accordance with this apparatus and method, the beacon signal is received at one of a plurality of wireless stations, where the beacon signal was directionally transmitted to the one wireless station, and where the beacon signal includes dedicated scheduling information for the one wireless station. The wireless station then communicates with the coordinator in accordance with the dedicated scheduling information included in the directionally transmitted beacon signal.

The above-identified and other objectives are further achieved by an apparatus and method that involve receiving both static information and dynamic information from a coordinator. In accordance with this apparatus and method, a sequence of beacon signals is received at one of a plurality of wireless stations, where each of the beacon signals was transmitted omni-directionally, and where each of the beacon signals included dynamic information and a fragment of the static information, such that all of the static information is received upon receiving all of the beacon signals. The apparatus and method also involve communicating with the coordinator in accordance with the information received on the sequence of beacon signals.

Additional features and advantages of the invention will be set forth in the description which follows and, in part, will be apparent from the description, or learned by practicing the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

MODE FOR THE INVENTION

Reference will now be made in detail to the preferred embodiments of the present invention, examples of which are illustrated in the accompanying drawings.

In the description that follows, the coordinator and the wireless station (i.e., wireless device) are separately described. However, it is understood that the coordinator can be a wireless station, and vice versa.

FIG. 2 illustrates, in greater detail, the information element (IE) field of FIG. 1. As shown, the IE field includes a schedule information. The schedule information, in turn, is conveyed in at least one schedule block. In FIG. 2, there are n number of schedule blocks. A schedule block is defined for each wireless station performing communication. However, if a scheduling block for less than all or for only one wireless station schedule block is carried over a single beacon, overhead may be reduced.

Thus, in accordance with a first exemplary embodiment of the present inventions overhead is reduced by transmitting IEs for fewer than all of the wireless stations, or for only one wireless station. Further, in accordance with this first exemplary embodiment, it primarily applies to a beacon that is transmitted directionally rather than omni-directionally. The second exemplary embodiment applies primarily to a beacon transmitted omni-directionally. More will be said with regard to the second embodiment later.

FIG. 3 illustrates a coordinator performing directional communications with wireless stations 1-3 via beam link signals 310, 320 and 330, respectively. In case that a beacon is directionally transmitted, as shown in FIG. 3, an IE structure of the beacon according to one exemplary embodiment of the present invention is shown in FIG. 4.

Referring now to FIG. 4, the following information elements may be included in the directional beacon, in addition to the information element (IE) index and length. First is a control IE which includes IEs relevant to network control, such as a power management IE and a scan IE.

The beacon may also include a CAP allocation IE is the IE for a part set to a contention access period (CAP) within a beacon interval. By receiving a corresponding beacon, all wireless stations become aware of information on the CAP within the whole beacon interval. The beacon interval can be defined as the interval between the transmission of a beacon and the transmission of the next beacon or the interval between a beacon period and a next beacon period.

Schedule blocks, such as those shown in FIG. 2, are also included in the schedule IE of FIG. 4. Each of the schedule blocks defines a source ID, a destination ID, a starting point of an interval to be allocated, a duration of an interval to be allocated or the like.

According to this exemplary embodiment of the present invention, if the coordinator transmits a beacon directionally to a target station, the IE structure of the beacon will include a schedule block that contains a source ID or destination ID that matches an identifier associated with the target station. The IE structure will not include schedule blocks for stations other than the target station (i.e., stations outside the coverage area of the beacon). Therefore, each wireless station receives dedicated information via a directionally transmitted beacon.

In this case, when each of the wireless stations receives a beacon from the coordinator, via a directional antenna, it receives control IE information first and then it receives information on an interval set to a CAP within a beacon interval. In addition, each of the wireless stations receives schedule information corresponding to itself only.

FIG. 5 is a diagram of an example of a beacon interval recognized by each wireless station in case of FIG. 3. Referring to FIG. 5, each CAP is an interval defined by a corresponding CAP allocation IE. The CTA interval is an interval defined by a corresponding schedule IE. Information on the CAP is shared by all wireless stations, but information on the CTA interval is defined by a schedule block within a specific schedule IE for each wireless station. With regard to each wireless station, the rest part of the beacon interval is unallocated channel time or a CTA interval allocated to another wireless station.

FIG. 6 shows a comparison between a conventional beacon interval and an interval where a directional beacon according to a first exemplary embodiment of the present invention is transmitted. Referring to FIG. 6, a control IE and a CAP allocation IE are included in each beacon. However, in accordance with a conventional beacon interval, schedule IEs 610, 620 and 630 cover all the wireless stations. In contrast, according to the first exemplary embodiment of the present invention, dedicated schedule IEs 615, 625 and 635 having information dedicated to a specific wireless station only are included in a directional beacon. Accordingly, in this embodiment, the number of schedule blocks decreases to the size of a schedule IE. Consequently, the total size of beacon is reduced as well.

If a beamforming process fails, it may be advantageous to send the beacon omni-directionally. Moreover, in short-range communications, a beacon is usually transmitted omni-directionally.

Figure 7:
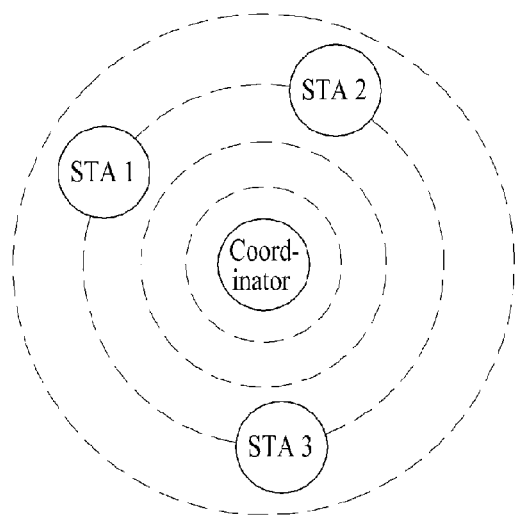
FIG. 7 illustrates an exemplary case where the coordinator sends a beacon omni-directionally.

With reference to FIG. 7, a second exemplary embodiment is described, wherein the coordinator transmits an omni-directional beacon. In this embodiment, it will assumed that the wireless stations existing within the piconet have limited mobility. In addition, information included in a beacon can be divided into static information and dynamic information. Static information means the information does not vary significantly from one beacon interval to the next. Information relating to isochronous traffic is a representative example of static information. Dynamic information means the information significantly varies from one beacon interval to the next. Asynchronous traffic information on CAP and information on control IE are representative examples of dynamic information. In the case of asynchronous traffic, corresponding information is unable to avoid varying each time. Further, the start or interval of the CAP differs from one beacon interval to the next. With power management, or the like, a control IE may differ from one beacon interval to the next, as well.

If static information is sent in each beacon, it is a waste of network resources. So, while dynamic information should be sent per beacon, static information need not be transmitted per beacon. Therefore, in accordance with the second exemplary embodiment static information is fragmented (i.e., divided into fragments), for example M fragments. Each wireless station then receives all of the static information by combining the corresponding M fragments received over M number of beacons.

Figure 8:
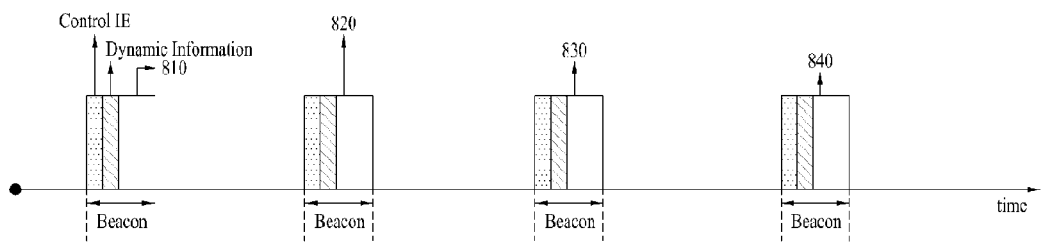
FIG. 8 illustrates the transmission of static information over several beacons according to a second exemplary embodiment of the present invention and in accordance with the omni-directional beacon of FIG. 7.

FIG. 8 illustrates transmitting static information carried over several beacons, according to the second exemplary embodiment of the present invention. Referring to FIG. 8, it is assumed, for purposes of explanation only, that the static information is divided into three fragments. A wireless station should then receive three beacons in order to receive all the static information 810, 820 and 830. A fourth beacon contains different static information 840.

Figure 9:
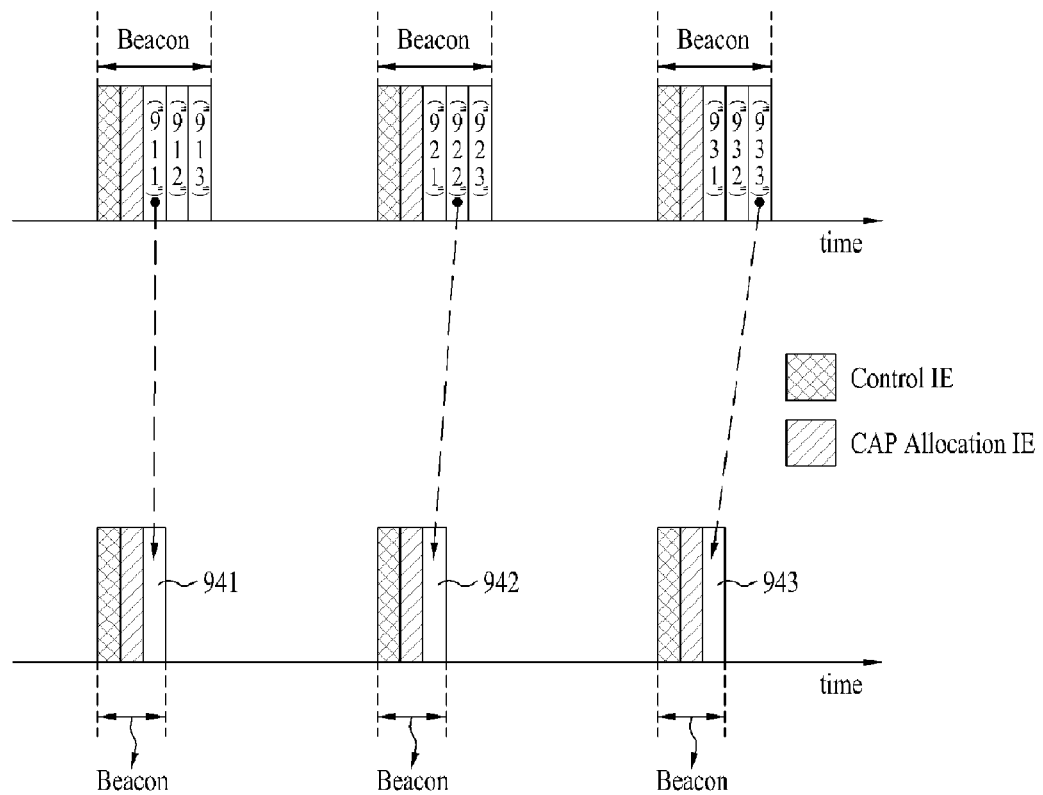
FIG. 9 is a diagram comparing a conventional beacon and a beacon according to the second exemplary embodiment of the present invention, with respect to beacon interval.

FIG. 9 compares a conventional beacon and a beacon according to the second exemplary embodiment of the present invention. As shown, the beacon according to the second exemplary embodiment of the present invention sends static information by first dividing the static information into M fragments 941, 942 and 943. Again, for purposes of illustration only, it is assumed that static information is divided into three fragments (i.e., M equals 3). According to the second exemplary embodiment of the present invention, because each beacon contains one of the fragments 941, 942 or 943, of the static information, the size of beacon is reduced.

In this embodiment, each wireless station receives all the dynamic information in each beacon without discriminating the wireless stations. For static information, each wireless station receives fragmented information only with each beacon. However, after receiving all M fragments of static information, all the wireless stations will have received all the static information.

Figure 10:
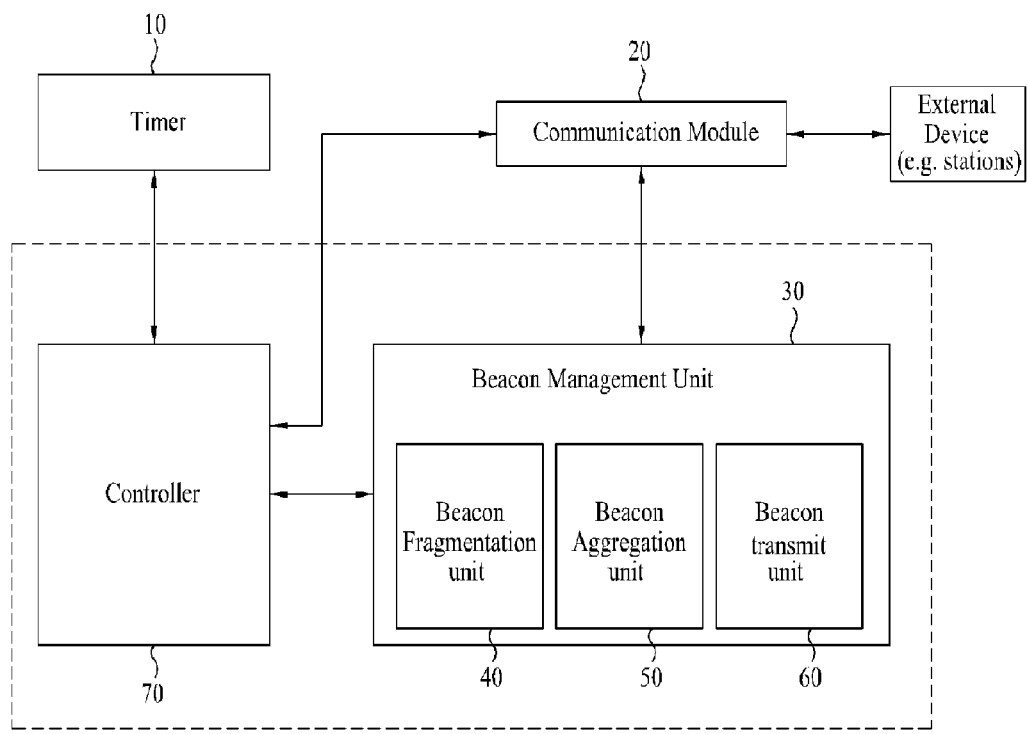
FIG. 10 is a block diagram of a coordinator according to exemplary embodiments of the present invention.

FIG. 10 is a block diagram of a coordinator according to exemplary embodiments of the present invention. Referring to FIG. 10, the coordinator may include a timer 10, a communication module 20, a beacon management unit 30 and a controller 70

The timer 10 plays a role in announcing the start time and ending time of a beacon interval thereby defining the interval between a beacon signal and a next beacon signal. The timer 10 is also able to provide timing information within the beacon interval.

The communication module 20 plays a role in transmitting data from the coordinator to a station. It also plays a role in receiving data transmitted from a station.

The beacon management unit 30 plays a role in managing an information element within a beacon signal, such as a control information element, a schedule information element and the like. The beacon management unit 30 may include a beacon fragmentation unit 40, a beacon aggregation unit 50 and a beacon transmit unit 60.

The beacon fragmentation unit 40 plays a role in separating an information element from a beacon signal under the control of the controller 70. For instance, the beacon fragmentation unit 40 is able to separate schedule information elements, included in a beacon signal, into schedule information elements associated with the respective stations. In addition, beacon fragmentation unit 40 is able to separate an information element into static information and dynamic information under the control of the controller 70.

The beacon aggregation unit 50 is able to generate a beacon signal by combining information elements for a specific station among the information elements separated by the beacon fragmentation unit 40. For instance, in order to generate a beacon signal for station A only, the beacon aggregation unit 50 is able to generate a beacon signal in a manner that schedule information elements for station A among schedule information elements are included in the beacon signal.

The beacon transmit unit 60 plays a role in directionally transmitting the beacon signal, generated by the beacon aggregation unit 50, to a specific station under the control of the controller 70.

The controller 70 controls the beacon management unit 30 so it generates a beacon signal for a specific station. The controller 70 is able to control the generated beacon signal to be omni-directionally transmitted or directionally transmitted to a specific station.

In this description of the present embodiment the roles of the controller 70 are separate from those of the beacon management unit 30. It is understood that the controller 70 plays a role as the beacon management unit 30.

Figure 11:
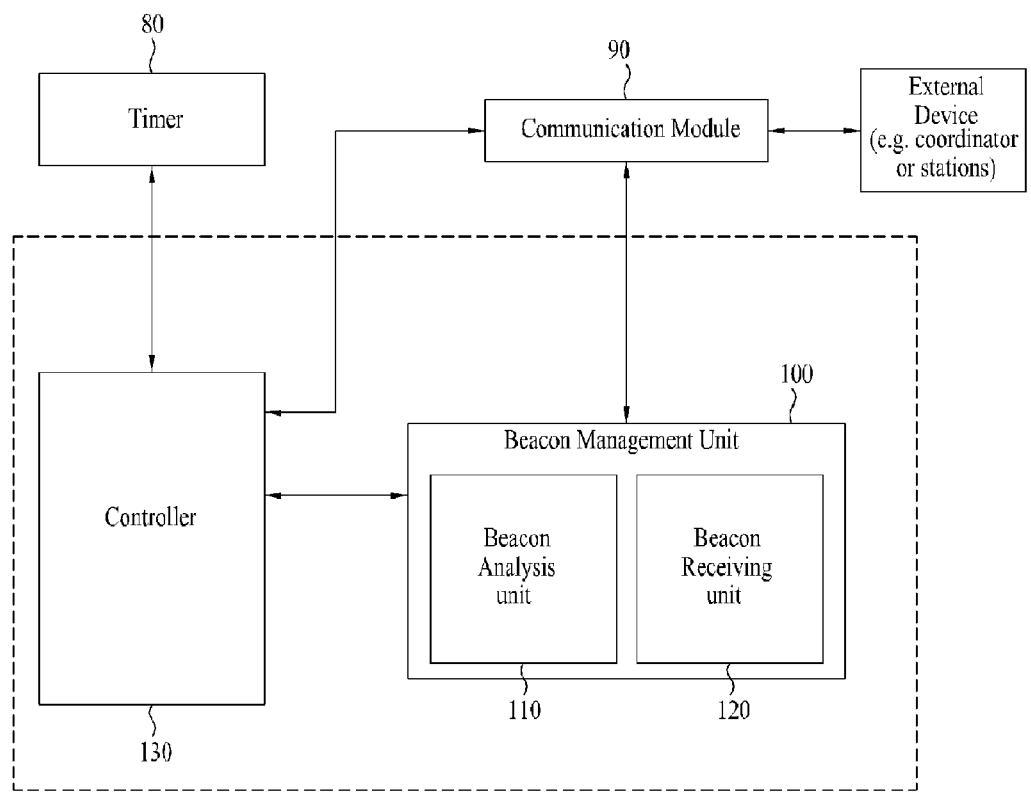
FIG. 11 is a block diagram of a wireless device according to exemplary embodiments of the present invention.

FIG. 11 is a block diagram of a station according to exemplary embodiments of the present invention. Referring to FIG. 11, the station may include a timer 80, a communication module 90, a beacon management unit 100 and a controller 130.

The timer 80 indicates the start time and ending time for a beacon interval thereby defining the time interval between a beacon signal and a next beacon signal. The timer 80 is able to provide timing information within a beacon interval.

The communication module 90 plays a role in transmitting data to another station or to the coordinator. It also plays a role in receiving data transmitted from other stations or from the coordinator.

The beacon management unit 100 may include a beacon analysis unit 110 and a beacon receiving unit 120. The beacon receiving unit 110 plays a role in receiving a beacon signal from the coordinator. The beacon analysis unit 110 analyzes the received beacon signal and is then able to obtain information contained in the beacon signal including schedule information.

The controller 130 controls data to be exchanged with other stations based on the information received and analyzed by the beacon management unit 100.

In this description of the present embodiment, the roles of the controller 130 are separate from those of the beacon management unit 100. However, it is understood that the controller 130 is able to play a role as the beacon management unit 100.

As illustrated above, the present invention relates to a method of reducing the overhead of a beacon by optimizing the elements of the beacon and by adjusting a transmission period of each of the elements. The present invention is applicable to a short-range communication system that performs communication based on either a directional beam link signal or an omni-directional beam link.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The present invention relates to an apparatus and/or a method for reducing the overhead of a beacon and method thereof.

The invention claimed is:

1. In a wireless communications system, a method of transmitting beacon signals including static information and dynamic information to each of a plurality of wireless stations, said method comprising:
dividing the static information into a plurality of static information fragments;
generating a sequence of beacon signals, each including dynamic information and at least one of said static information fragments; and
transmitting the sequence of beacon signals omni-directionally to the plurality of wireless stations such that all of the static information is transmitted when all of the beacon signals have been transmitted.

2. The method of claim 1, wherein the beacon signal further includes at least one of an index, length information, control information and contention access period allocation information.

3. In a wireless communications system that includes a coordinator and a plurality of wireless stations, a method of receiving both static information and dynamic information from the coordinator, said method comprising:
receiving a sequence of beacon signals at one of the plurality of wireless stations, each of the beacon signals having been transmitted omni-directionally, each of the beacon signals including dynamic information and a fragment of the static information, such that all of the static information is received upon receiving the sequence of beacon signals; and
communicating with the coordinator in accordance with the information received on the sequence of beacon signals.

4. The method of claim 3 further comprising:
receiving the sequence of omni-directionally transmitted beacon signals at each of the other wireless stations.

5. The method of claim 3, wherein the beacon signal further includes at least one of an index, length information, control information and contention access period allocation information.

6. In a wireless communications system that includes a plurality of wireless stations and a coordinator, an apparatus in one of said wireless stations for receiving and processing static and dynamic information, the apparatus comprising:
a communication module configured to transmit and receive data to and from at least one other wireless station or the coordinator;
a beacon management unit configured to receive a sequence of beacon signals transmitted omni-directionally from the coordinator and to analyze static and dynamic information contained on the sequence of beacon signals, wherein each of the beacon signals contains dynamic information and a fragment of the static information such that all of the static information is received when the sequence of beacon signals is received; and
a controller configured to control the exchange of data with the at least one other wireless station or the coordinator based on the information contained on the beacon signals.

7. The apparatus of claim 6, wherein the beacon signal further includes at least one of an index, length information, control information and contention access period allocation information.

8. In a wireless communications system that includes a plurality of wireless stations, an apparatus for transmitting static and dynamic information, said apparatus comprising:
a communication module configured to transmit and receive data to and from the wireless stations;
a beacon management unit configured to generate a sequence of beacon signals and configured to omni-directionally transmit the sequence of beacon signals to the wireless stations, each of the beacon signals containing dynamic information and a fragment of the static information such that all of the static information is transmitted when all of the beacon signals are transmitted; and
a controller configured to control the beacon management unit to generate and to omni-directionally transmit the sequence of beacon signals.

9. The apparatus of claim 8, wherein the beacon signal further includes at least one of an index, length information, control information and contention access period allocation information.

* * * * *